United States Patent
Longobardi et al.

(10) Patent No.: US 10,937,165 B2
(45) Date of Patent: Mar. 2, 2021

(54) COMPARISON OF RELEVANT PORTIONS OF IMAGES

(71) Applicant: International Business Machines Corporation, Armonk, NY (US)

(72) Inventors: Giuseppe Longobardi, Castellammare di Stabia (IT); Raffaella Viola, Rome (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 15/927,405

(22) Filed: Mar. 21, 2018

(65) Prior Publication Data
US 2019/0295258 A1    Sep. 26, 2019

(51) Int. Cl.
*G06T 7/11*    (2017.01)
*G06T 7/174*    (2017.01)
*G06T 7/00*    (2017.01)

(52) U.S. Cl.
CPC .............. *G06T 7/11* (2017.01); *G06T 7/174* (2017.01); *G06T 7/97* (2017.01)

(58) Field of Classification Search
CPC ... G06T 7/11; G06T 7/174; G06T 7/97; G06T 2207/10032; G06T 2207/30184; G06T 7/001
See application file for complete search history.

(56) References Cited

U.S. PATENT DOCUMENTS 6,154,577 A    11/2000 Warnick et al.
6,963,662 B1 *    11/2005 LeClerc .............. G06K 9/00201
345/419

(Continued)

FOREIGN PATENT DOCUMENTS

WO    2009023363 A2    2/2009

OTHER PUBLICATIONS

Khalili Moghadam, et al., "Automatic Urban Illegal Building Detection Using Multi-Temporal Satellite Images and Geospatial Information Systems", the International Archives of the Photogrammetry, Remote Sensing and Spatial Information Sciences, vol. XL-1/W5, 2015, pp. 387-393, <http://www.int-arch-photogramm-remote-sens-spatial-inf-sci.net/XL-1-W5/387/2015/isprsarchives-XL-1-W5-387-2015.pdf>.

(Continued)

*Primary Examiner* — Xuemei G Chen
(74) *Attorney, Agent, or Firm* — Jay Wahlquist

(57) ABSTRACT

A computing system provides a reference image and a current image representing a territory at different times. The computing system determines a partition of the reference image into a first relevant portion and a first non-relevant portion and of the current image into a second relevant portion and a second non-relevant portion according to a partitioning rule. The computing system compares the second relevant portion of the current image with the first relevant portion of the reference image for determining one or more different regions of the current image with respect to the reference image. The computing system determines one or more critical regions of the current image corresponding to the one or more different regions according to a criticality rule. The computing system provides a notification based on the one or more critical regions for use in enforcing land use controls.

20 Claims, 6 Drawing Sheets

(56) References Cited

U.S. PATENT DOCUMENTS

| | | | |
|---|---|---|---|
| 7,884,322 B2* | 2/2011 | Sasajima | G06T 7/001 |
| | | | 250/306 |
| 8,244,013 B2 | 8/2012 | Galant | |
| 8,259,993 B2* | 9/2012 | Sasakawa | G06T 7/12 |
| | | | 382/100 |
| 9,020,192 B2 | 4/2015 | Qu et al. | |
| 10,095,995 B2* | 10/2018 | Green | G06T 17/05 |
| 10,127,670 B2* | 11/2018 | Lewis | G06F 16/532 |
| 10,127,685 B2* | 11/2018 | Qian | G01C 21/005 |
| 10,325,370 B1* | 6/2019 | Jabari | G06T 7/32 |
| 10,643,071 B2* | 5/2020 | Slesarev | G06K 9/342 |
| 2005/0034074 A1* | 2/2005 | Munson | G09B 29/106 |
| | | | 715/712 |
| 2008/0298638 A1* | 12/2008 | Miyazaki | G06K 9/00637 |
| | | | 382/106 |
| 2008/0309501 A1* | 12/2008 | Redaelli | G08B 17/005 |
| | | | 340/578 |
| 2008/0310736 A1* | 12/2008 | Chattopadhyay | G06F 11/3692 |
| | | | 382/218 |
| 2009/0296990 A1* | 12/2009 | Holland | G06T 7/60 |
| | | | 382/106 |
| 2010/0128977 A1* | 5/2010 | Yagyuu | G06T 7/254 |
| | | | 382/165 |
| 2013/0077819 A1* | 3/2013 | Du | G06K 9/4661 |
| | | | 382/103 |
| 2013/0155109 A1* | 6/2013 | Schultz | G06T 7/62 |
| | | | 345/634 |
| 2014/0064554 A1 | 3/2014 | Coulter et al. | |
| 2014/0122531 A1 | 5/2014 | Zuccarino et al. | |
| 2014/0201126 A1 | 7/2014 | Zadeh et al. | |
| 2015/0347872 A1* | 12/2015 | Taylor | G06K 9/3233 |
| | | | 382/224 |
| 2016/0125265 A1* | 5/2016 | Xie | G06T 7/74 |
| | | | 382/209 |
| 2017/0236024 A1* | 8/2017 | Wang | G06K 9/00201 |
| | | | 382/201 |
| 2020/0175352 A1* | 6/2020 | Cha | G06T 7/0004 |

OTHER PUBLICATIONS

Singhal, et al., "Automatic Detection of Buildings from Aerial Images Using Color Invariant Features and Canny Edge Detection", International Journal of Engineering Trends and Technology (IJETT)—vol. 11, No. 8, May 2014, pp. 393-396, <http://ijettjournal.org/volume-11/number-8/IJETT-V11P277.pdf>.

Xu, et al., "Detection and Classification of Changes in Buildings From Airborne Laser Scanning Data", ISPRS Annals of the Photogrammetry, Remote Sensing and Spatial Information Sciences, vol. II-5/W2, 2013, pp. 343-348, <http://www.isprs-ann-photogramm-remote-sens-spatial-inf-sci.net/II-5-W2/343/2013/isprsannals-II-5-W2-343-2013.pdf>.

* cited by examiner

COMPARISON OF RELEVANT PORTIONS OF IMAGES

BACKGROUND

The present disclosure relates to the information technology field. More specifically, this disclosure relates to land use control.

Land use control can be important for regulating correct uses of land. Land use control can include land use planning, zoning regulations, and building permit requirements. Theses can include control over things including the type and amount buildings that may be constructed in a specific territory (for example, a municipality or county). Land use controls can establish where and how buildings may be constructed (for example, their type, size and appearance). Land use controls can be concerned with appropriate development of the territory for public interest under different aspects, for example, environmental protection, zoning, safety, heritage conservation, urban renewal. These aims of land use planning can be important for ensuring sustainable development, especially in view of recent climate changes and increased population growth.

In some land use control situations, an approval (which can be in the form of a construction permit) can be needed before performing any improvements to real property (including new buildings and refurbishments thereof). It is possible for land owners or other parties to perform improvements to real property without obtaining the required construction permit and/or in ways which deviate from the construction permit. In both cases, the corresponding (unauthorized) buildings may have detrimental effects on the public interest. For example, unauthorized buildings may damage the environment, may be inadequate in the zone, may be unsafe, may destroy heritage or landmark sites, and may spoil the landscape.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

Disclosed herein are embodiments of a method, system, and computer program product for enforcing land use controls. A computing system provides a reference image and a current image representing a territory at different times. The computing system determines a partition of the reference image into a first relevant portion and a first non-relevant portion and of the current image into a second relevant portion and a second non-relevant portion according to a partitioning rule. The computing system compares the second relevant portion of the current image with the first relevant portion of the reference image for determining one or more different regions of the current image with respect to the reference image. The computing system determines one or more critical regions of the current image corresponding to the one or more different regions according to a criticality rule. The computing system provides a notification based on the one or more critical regions for use in enforcing land use controls.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

The detection of unauthorized buildings in violation of various land use controls including land use planning, zoning regulations, and building permit requirements can be challenging. Direct inspection of a territory of land (for example, by dedicated officials) can be very time consuming and expensive, so as to be untenable in practice (especially when the territory is large, and the available human resources are limited). Moreover, this activity is largely manual, so that it may be prone to errors and omissions.

Another possibility for detection is of acquiring aerial images of the territory over time (for example, taken from a satellite). Image processing techniques may then be used to process the images for detecting unauthorized buildings. For this purpose, several techniques are available for solving problems caused by occlusions and light reflections/absorptions, for identifying buildings and for detecting changes thereof. This information may be used to discover buildings that are under construction. These buildings can be checked against an official database storing the construction permissions. Any buildings that do not have the required construction permits or permissions can be deemed suspect and they can be inspected in the field. In this way, unauthorized buildings may be detected almost automatically, in a faster, less expensive and more accurate way compared to manual detection.

However, comparison of the images for detecting changes of buildings can be quite complex from a computational point of view. Therefore, this operation can cause high consumption of hardware and/or software resources of a computing system wherein a software program performing the comparison runs (for example, processing power, memory space, operating system services, process/thread allocations, etc.). All of the above has a negative effect on the performance of the computing system and then of the software program performing the comparison; moreover, this may also adversely affect any other software programs running on the same computing system. The above-mentioned performance degradation is especially evident when the images to be compared are sizeable (for example, large and with a high resolution) and/or the computing system is of low quality or performance level. As a consequence, this may require a reduction of a frequency of the verification of the territory (with the risk of not intervening promptly), a lowering of the resolution of the images (with a loss of accuracy) or an enhancement of the computing system (with an increase of costs).

With reference now to FIG. 1A-FIG. 1D, an overview of the general principles of the disclosure are depicted according to an embodiment of the present disclosure.

Figure 1A:
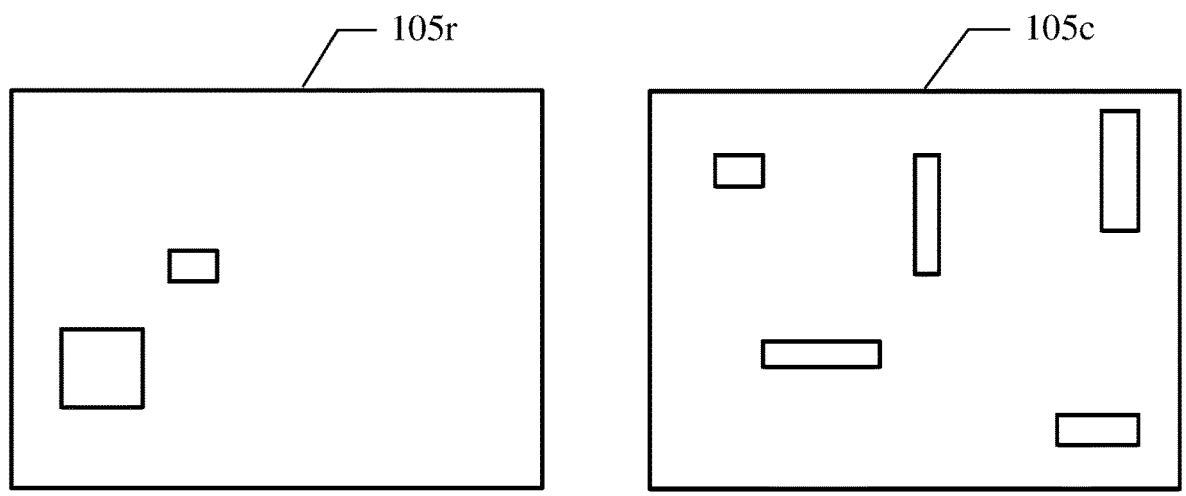
FIG. 1A-FIG. 1D depict an overview of the general principles of the disclosure according to an embodiment of the present disclosure.

Starting from FIG. 1A, a reference image 105$r$ and a current image 105$c$ are provided. The reference image 105$r$ and the current image 105$c$ represent a territory to be controlled (for example, a municipality). The territory to be controlled can be any area of land, including a city, county, state, or other division of land. The reference image 105$r$ and the current image 105$c$ depict the territory at different times; for example, the reference image 105$r$ can be acquired at the start of monitoring the land, and later on, the current image 105$c$ can be acquired, including multiple versions of current image 105$c$ acquired on a periodic basis.

Figure 1B:
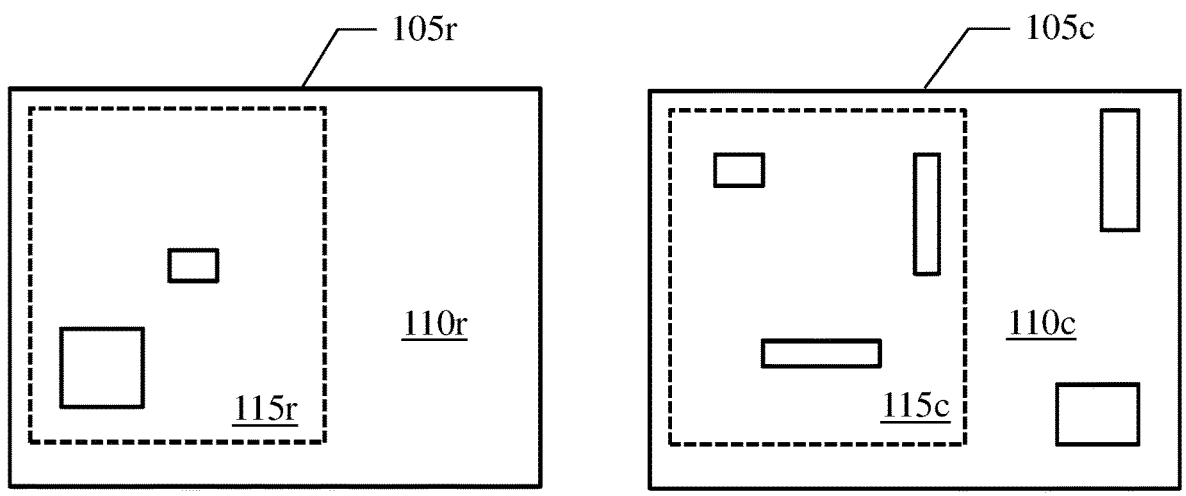

Moving to FIG. 1B, a partition is determined of the reference image 105$r$ and the current image 105$c$, so as to partition them into a relevant portion (denoted by 110$r$ and 110$c$, respectively) and a non-relevant portion (denoted by 115$r$ and 115$c$, respectively). The partition of the (reference/current) images 105$r$ and 105$c$ can be determined according to one or more partitioning rules. For example, this result is achieved by determining the non-relevant portion 115$r$ of the reference image 105$r$ as representing areas unsuitable for construction (such as water bodies or impervious mountains).

Figure 1C:
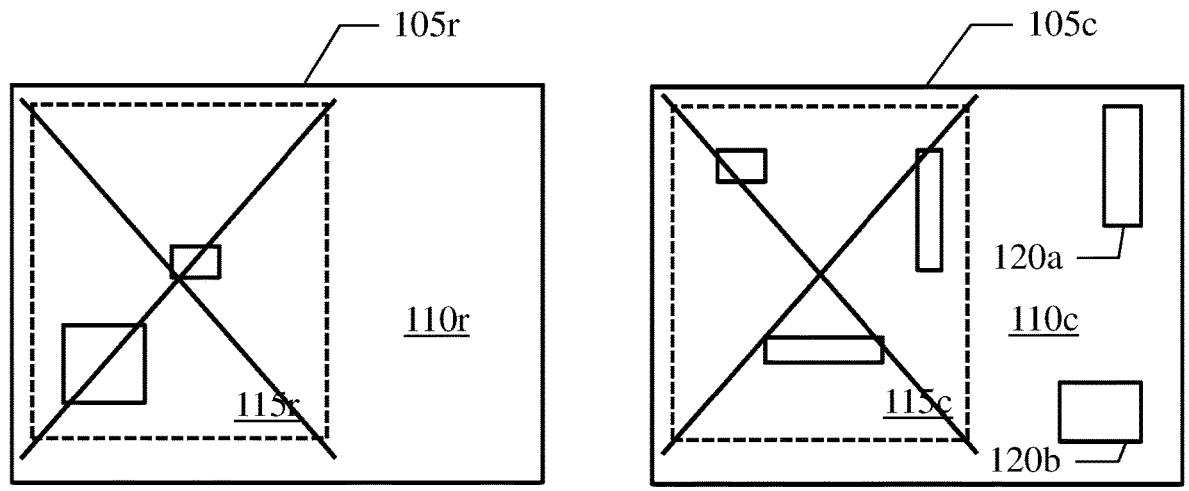

Moving to FIG. 1C, the relevant portion 110$c$ of the current image 105$c$ is compared with the relevant portion 110$r$ of the reference image 105$r$. This comparison can occur after filtering the images to remove their non-relevant portions 115$c$ and 115$r$, respectively. This comparison is aimed at determining any different regions of the current image 105$c$ with respect to the reference image 105$r$ in their relevant portions 110$c$ and 110$r$, respectively. For example, in the relevant portion 110$c$ of the current image 105$c$ there are two different regions 120$a$ and 120$b$ (which differ from the relevant portion 110$r$ of the reference image 105$r$). In other embodiments, any number of different regions may be present.

Figure 1D:
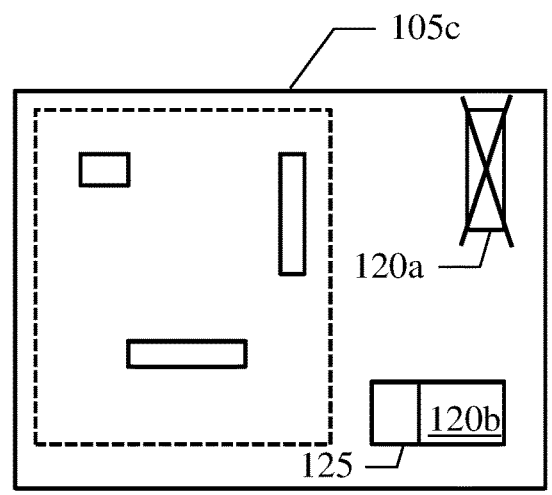

Moving to FIG. 1D, any critical regions of the current image 105$c$ corresponding to its different regions 120$a$ and 120$b$ are determined. The critical regions are determined according to one or more criticality rules. For example, this result is achieved by identifying any buildings that are represented (at least in part) in the different regions 120$a$ and 120$b$ and then verifying whether these buildings are compliant with the land use controls of the territory. In the example at issue, a critical region 125 corresponding to the different region 120$b$ is determined since it represents an (unauthorized) building that is not compliant with the land use controls, whereas the different region 120$a$ does not represent any building or it represents an (authorized) building that is compliant with the building planning. A notification based on the critical region(s) 125 can then be provided (for example, by sending a message identifying the corresponding unauthorized building to a relevant authority). This notification can be used for enforcing the land use controls accordingly (for example, triggering the ordering of a corresponding penalty).

The limitation of the comparison between the current image 105$c$ and the reference image 105$r$ to their relevant portions 110$c$, 110$r$ can significantly reduce its computational complexity, particularly where the relevant portion is a small portion of the images. Therefore, this can provide a lower consumption of hardware and/or software resources of a computing system wherein a software program performing the comparison runs (for example, processing power, memory space, operating system services, process/thread allocations, etc.). All of the above has a positive effect on the performance of the computing system and then of the software program performing the comparison; moreover, this can avoid (or at least substantially reduce) any adverse effect on other software programs that may be running on the same computing system. The above-mentioned performance improvement can be especially evident when the images 150$c$ and 105$r$ to be compared are sizeable (for example, large and with a high resolution) and/or the computing system is of low quality or performance level. As a consequence, a frequency of the verification of the territory may be increased (with the possibility of intervening promptly), the resolution of the images 105$c$ and 105$r$ may be increased (with a higher accuracy), and/or the computing system may be simplified (with a reduction of costs).

Figure 2:
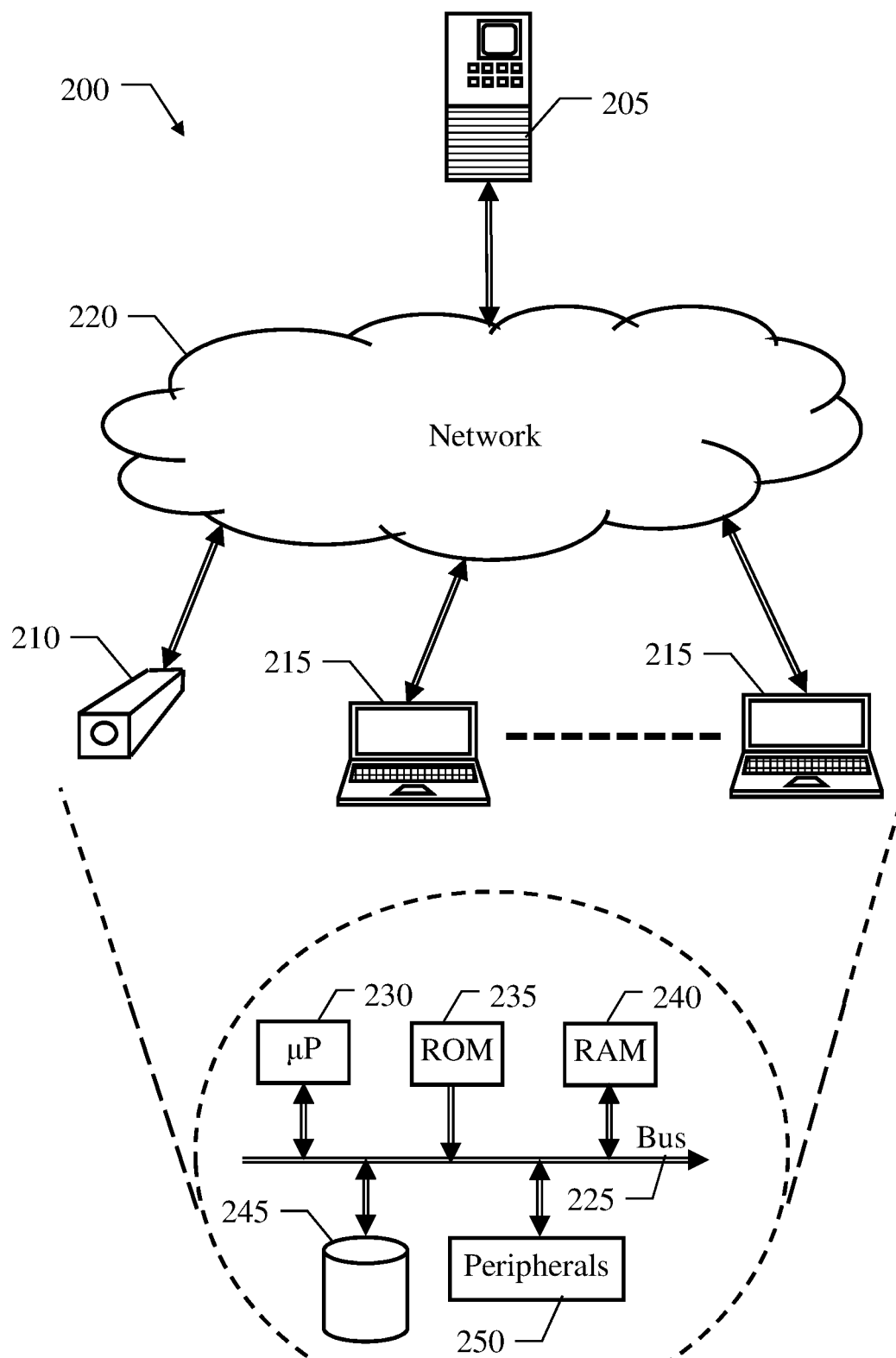
FIG. 2 shows a schematic block diagram of a computing infrastructure in which some embodiments of the present disclosure can be implemented.

With reference now to FIG. 2, a schematic block diagram is shown of a computing infrastructure 200 in which some embodiments of the present disclosure can be implemented.

The computing infrastructure 200 comprises the following components. A server computing machine (which can be a control server), or simply server 205 is used to enforce land use controls. One or more cameras 210 is used to acquire images of the territory (for example, aerial images acquired from a satellite if camera(s) 210 are located on a satellite). One or more client computing machines (which can be official client computing machines), or simply clients 215 (for example, laptops, tablets, smartphones) can be assigned to officials in charge of enforcing land use controls. The computing infrastructure 200 can have a distributed architecture with the server 205, the camera(s) 210, and the client(s) 215 that communicate among them over a network 220. Network 220 can be as large as the internet or can be a smaller network such as a wide area network (WAN), metropolitan area network (MAN), an intranet for a company or other organization, or any other form of network.

In some embodiments, one or more of the above-mentioned computing machines (server 205, camera(s) 210 and client(s) 215) comprises several units that are connected among them through a bus structure 225 with one or more levels, such as depicted in the exploded view surrounded by the dotted circle of FIG. 2. Particularly, one or more microprocessors (μP) 230 control operation of the computing machine 205-215; a non-volatile memory (ROM) 235 stores basic code for a bootstrap of the computing machine 205-215 and a volatile memory (RAM) 240 is used as a working memory by the microprocessors 230. The computing machine 205-215 is provided with a mass-memory 245 for storing programs and data. Examples of mass-memory 245 include storage devices of a data center, not shown in the figure, wherein the server 205 is implemented, a flash EEPROM for the camera 210, and corresponding hard disks for the clients 215. Moreover, the computing machine 205-215 comprises a number of controllers for peripheral (or Input/Output, I/O) units 250; for example, the peripheral units 250 of the server 205 comprise a network card for plugging the server 205 into the data center and then connecting it to a console of the data center (for example, a personal computer provided with a drive for reading/writing removable storage units, such as optical disks like DVDs) and to a switch/router sub-system of the data center for its communication with the network 220, the peripheral units 250 of the camera 210 comprises a light sensor (for example, of CCD type) for taking photographs and a network adapter for connecting to the network 220, whereas the peripheral units 250 of each client 215 comprise a keyboard, a trackpad, a monitor, a network adapter for connecting to the network 220 and a drive for reading/writing removable storage units as above. Many possible configurations of a computing machine 205-215 exist and these example configurations are not to be read as limiting.

Figure 3:
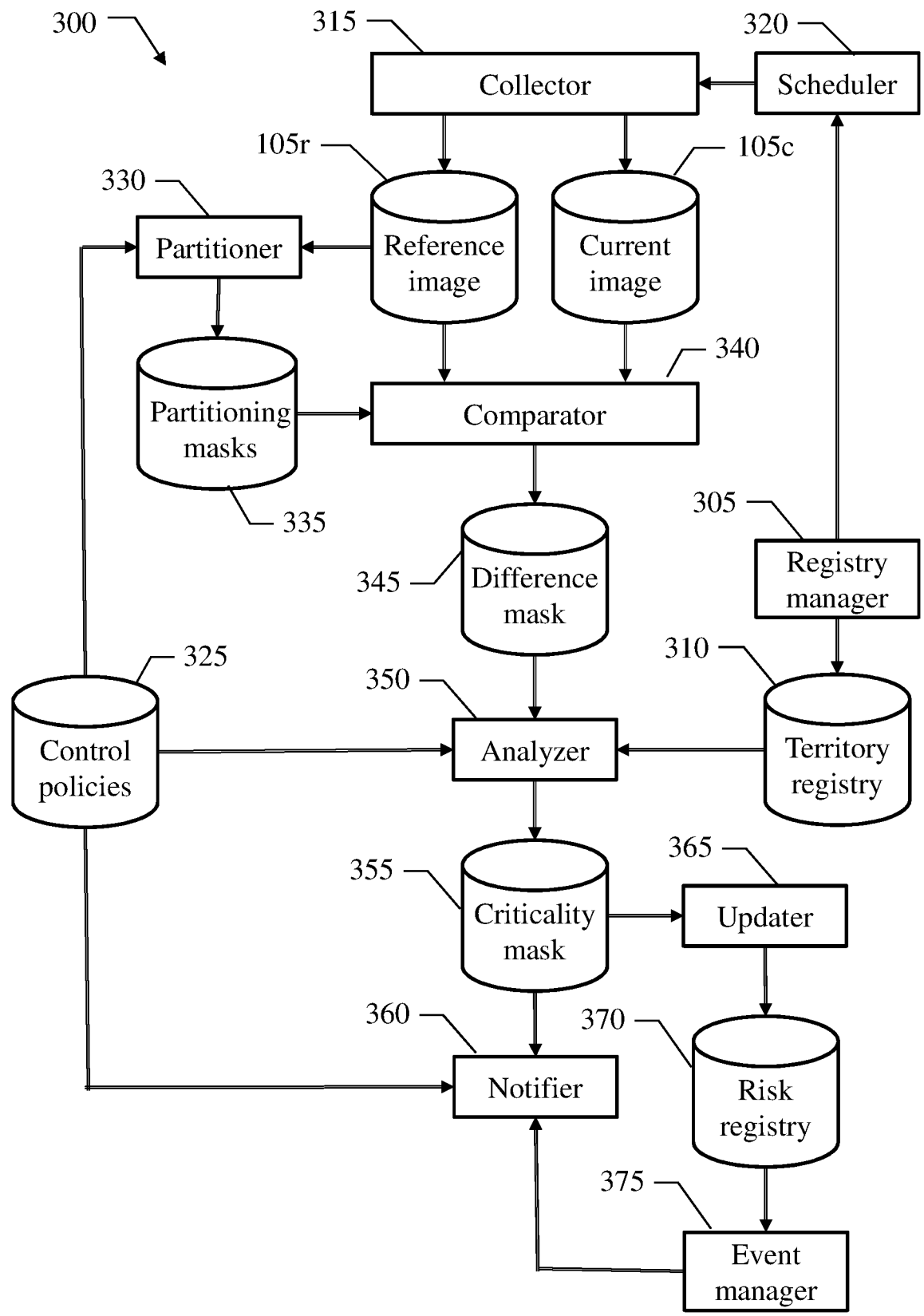
FIG. 3 shows example software components that may be used to implement an embodiment of the present disclosure.

With reference now to FIG. 3, example software components are shown that may be used to implement an embodiment of the present disclosure. While FIG. 3 depicts particular software components and file types, various modifications of the components shown in FIG. 3 may be made consistent with this disclosure including more or fewer components and/or substituted components. Some possible variations are discussed further below.

Particularly, all the software components (programs and data) are denoted as a whole with reference number 300. In some embodiments, some or all of the software components can be implemented as instructions stored on a memory, such as mass-memory 245, and executed by a processor, such as microprocessor 230. The software components can be stored in a mass memory of a server and loaded (at least partially) into the working memory of a server used to enforce land use controls for a territory when the programs are running, together with an operating system and other application programs (not shown in the figure). The programs can be initially installed into the mass memory, for example, from removable storage units or from a network. In this respect, each program may be a module, segment, or portion of code which comprises one or more executable instructions for implementing the specified logical function.

In detail, a registry manager 305 controls a file storing a territory registry 310. The territory registry 310 can contain an indication of authorized improvements to real property in the territory. For example, in some embodiments, the territory registry 310 can list authorized existing buildings that have already been constructed, authorized new buildings under construction, and authorized refurbishments to be executed on existing buildings, all of them in compliance with corresponding construction permissions. In some embodiments, the territory registry 310 can identify each building by its location (such as by geographical coordinates of its boundaries) and can indicate one or more authorized characteristics thereof to be met (such as maximum size defined by maximum area and maximum height, color of walls, roof, etc.).

A collector 315 can collect the reference and current images (105r and 105c, respectively and corresponding to 105r and 105c of FIG. 1) of the territory over time. The collector 315 can control (in write mode) a file storing the reference image 105r and a file storing the current image 105c. Each image (105r and 105c) can consist of one or more frames representing corresponding areas of the territory (with all of the frames together representing the whole territory). Each frame of an image can be subdivided into and defined by a matrix of cells (for example, with 512 rows by 512 columns) containing values of corresponding pixels of the image. Each pixel can be an elementary visualizing element that represents a corresponding location of the territory; for example, each pixel value can be defined by its red, green, and blue (RGB) components (such as each coded on 8 bits). A scheduler 320 can control the collector 315 for triggering the collection of either or both of the reference image 105r or the current image 105c. In some embodiments, the scheduler 320 can also utilize a user interface for controlling collection manually and/or it can be controlled automatically by the registry manager 305.

One or more control policies 325 can be stored in a file and can define the land use controls for a territory. Each control policy 325 can define land use controls for separate purposes corresponding to each policy. In some embodiments, each control policy 325 can be comprised of a control frequency, a partitioning rule, a criticality rule, and one or more control actions. The control frequency can indicate how often the territory has to be controlled for the corresponding purpose (for example, every 1-10 days).

The partitioning rule can define the partitioning of the images 105r and 105c into their relevant portions and non-relevant portions for the corresponding purpose, according to one or more characteristics of interest thereof. For example, a partitioning rule of a control policy for detecting unauthorized buildings can provide that the non-relevant portion is defined by water bodies (such as seas, lakes, rivers) and/or impervious mountains (such as peaks, cliffs, gorges). The water bodies can be represented by each region having a minimum size (for example, number of cells corresponding to an area of 500-1,000 square meters) and a minimum percentage (such as 80-90%) of pixel values of substantially blue color in its different shades (for example, with a wavelength of 420-500 nm, or with specified RGB pixel values). The impervious mountains can be represented by each region having a minimum size (for example, number of cells corresponding to an area of 500-1,000 square meters) and a minimum slope (for example, 30-50% average slope). As another example, a partitioning rule of a control policy for detecting risky buildings can provide that relevant portions are defined by risky areas. The risky areas can be represented as being within a maximum distance (such as a length corresponding to 100-1,000 meters) from one or more risk elements (such as water bodies).

The criticality rule can define how to identify the critical regions (corresponding to the different regions between the reference and current images) for the corresponding purpose. In some embodiments, each criticality rule can specify important differences to be analyzed, one or more important objects to be searched, and one or more criticality conditions to be fulfilled. For example, the important differences can be defined by a minimum size (such as number of cells, like 1-2% of a total number of cells of the current image 105c). The criticality rule of the control policy for detecting unauthorized buildings can specify that the important objects are buildings and that the criticality conditions are their compliance with the territory registry, whereas the criticality rule of the control policy for detecting risky buildings can specify that the important objects are buildings and that the criticality conditions are their size higher than a specified size (for example, number of cells corresponding to 30-40 square meters). The control actions can indicate operations to be performed with respect to the important objects fulfilling the criticality conditions (represented by the critical regions). For example, the control actions of the control policy for detecting unauthorized buildings can specify that a notification (such as via e-mail) of the unauthorized buildings be sent to one or more authorities (such as local police or other enforcement officials), whereas the control actions of the control policy for detecting risky buildings can specify performing a calculation of corresponding risk indexes (for example, based on their distances from the closest water body) and saving an indication of the risky buildings in response to their detection and sending a notification (such as via e-mail) of the risky buildings to one or more authorities (such as local police or civil protection agency) in response to one or more corresponding types of risk events (such as an imminent or ongoing flood which puts the risky buildings at increased risk).

A partitioner 330 can determine corresponding partitions of the reference image 105r, and of the current image 105c (into their relevant portions and non-relevant portions) for the different partitioning rules, such as those partitioning rules discussed above. The partitioner 330 can access (in read mode) the control policies 325 and the reference image 105r. The partitioner 330 can access (in write mode) corresponding files storing partitioning masks 335, which can define the partitions. In some embodiments, each partitioning mask 335 can be formed by the same number of frames each defined by a matrix of cells with the same size as the images 105r and 105c. The partitioning masks 335 can distinguish relevant and non-relevant portions of an image by each cell of the partitioning mask 335 containing a flag that is asserted (for example, to the logic value 1) when the cell belongs to the relevant portion and that is deasserted (for example, to the logic value 0) when the cell belongs to the non-relevant portion.

A comparator 340 can compare the relevant portion of the current image 105c with the relevant portion of the reference image 105r (for determining any different regions of the current image 105c) for the partition of each selected control policy. The comparator 340 can access (in read mode) the reference image 105r, the current image 105c, and the partitioning masks 335. The comparator 340 can access (in write mode) a file storing a difference mask 345 which can define the different regions (of the current image 105c with respect to the reference image 105r) for the partition of the selected control policy 325. The difference mask 345 can be formed by the same number of frames each defined by a matrix of cells with the same size as the images 105r and 105c. In some embodiments, each cell of the difference mask 345 can contain a flag that is asserted when the cell belongs to the different regions and can be deasserted otherwise.

An analyzer 350 can determine any critical regions of the current image 105c (corresponding to its different regions) for the criticality rule of the selected control policy 325. The analyzer 350 can access (in read mode) the territory registry 310, the control polices 325, and the difference mask 345. The analyzer 350 can access (in write mode) a file storing a criticality mask 355 defining the critical regions (of the current image 105c) for the criticality rule of the selected control policy 325. The criticality mask 355 can be formed by the same number of frames each defined by a matrix of cells with the same size as the images 105r and 105c. In some embodiments, each cell of the criticality mask 355 can contain a flag that is asserted when the cell belongs to the critical regions and can be deasserted otherwise.

A notifier 360 can send, when appropriate given the control policies 325 as discussed above, a notification based on the critical regions (of the current image 105c) for the selected control policy 325. The notifier 360 can access (in read mode) the control policies 325 and the criticality mask 355. Additionally, an updater 365 can maintain information relating to the risky buildings (for the corresponding control policies 325). The updater 365 can access (in read mode) the criticality mask 355. The updater 365 can access (in write mode) a risk registry 370, which can store information relating to the risky buildings. In some embodiments, the risk registry 370 can identify each risky building by its location as above and can indicate the corresponding control policy and risk index. An event manager 375 can manage any risk events (for example, floods). The event manager 375 can access (in read mode) the risk registry 370 and can control the notifier 360.

Figure 4A:
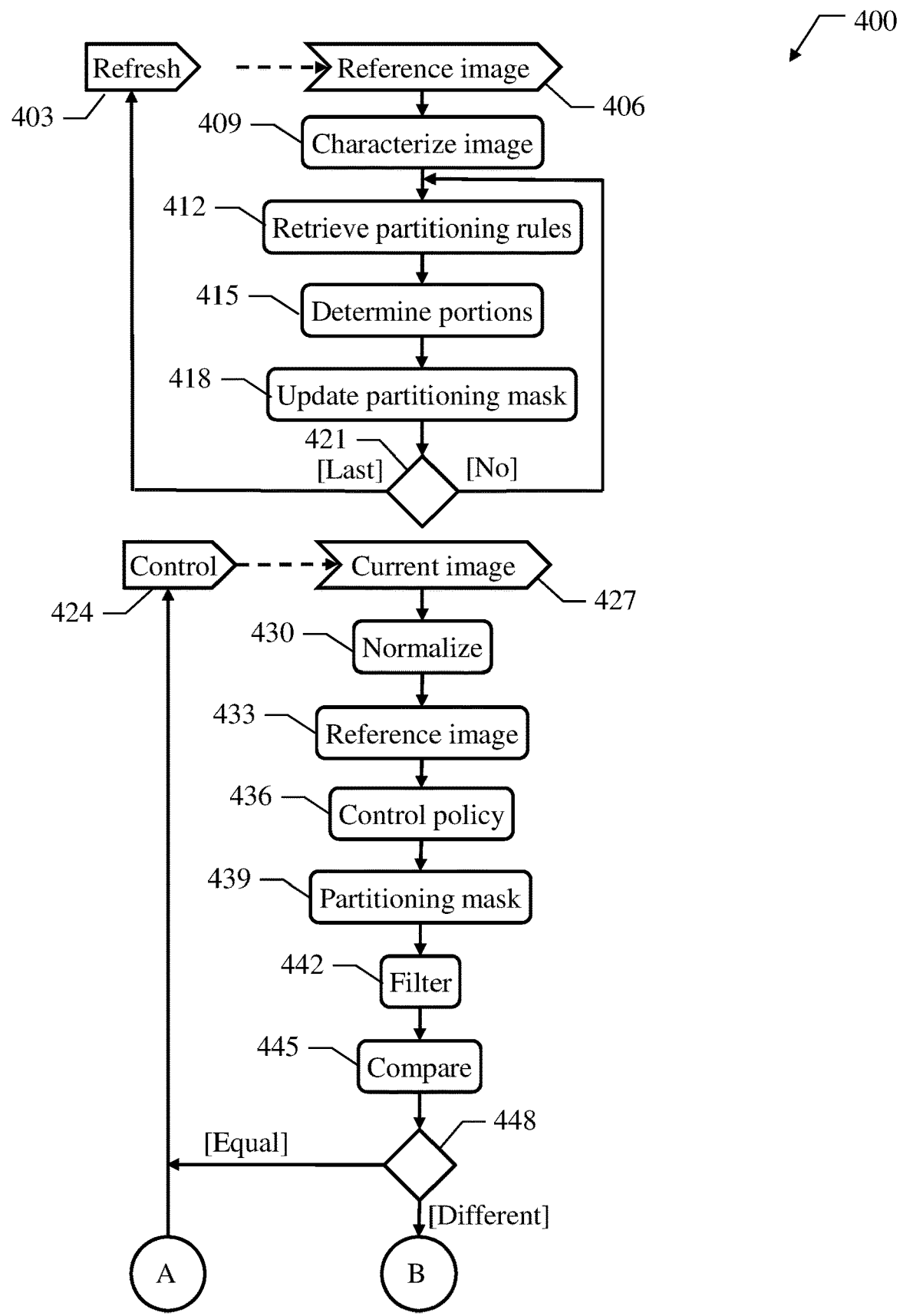
FIG. 4A-FIG. 4B depict an example method for an implementation of an embodiment of the present disclosure that may be used in enforcing land use controls for a territory.
Figure 4B:
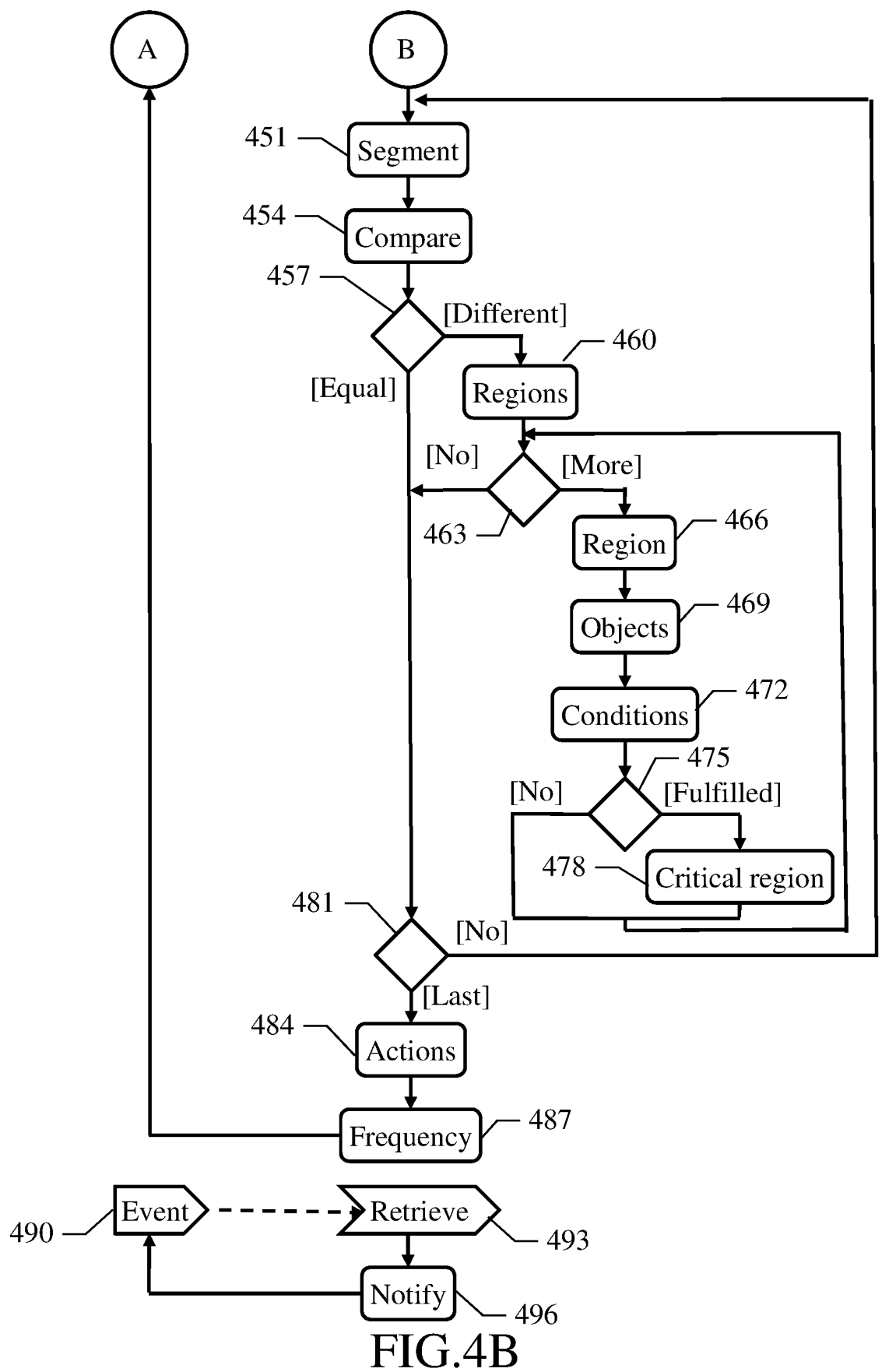

With reference now to FIG. 4A-FIG. 4B, an example method 400 is depicted for an implementation of an embodiment of the present disclosure that may be used in enforcing land use controls for a territory. In this respect, each block may correspond to one or more executable instructions for implementing the specified logical function on a server. While FIG. 4 and the discussion that follow depicts particular actions in order, various modifications of the actions and order may be made consistent with this disclosure including more or fewer actions and/or substituted actions. Some possible variations are discussed further below. Various portions of FIG. 4 include loops of actions which may be performed more than once. In various embodiments, method 400 can involve performing one or more actions a single time each or multiple times each.

The process can proceed from block 403 to block 406 every time a scheduler commands a refresh of the reference image in response to a corresponding refresh event. For example, the refresh event can be defined by the expiration of a predefined refresh period (for example, every 2-4 weeks). Refreshing the reference image can ensure that the reference image is always maintained up-to-date. In addition, or in the alternative, the refresh event can be defined by the completion of each authorized improvement to real property in the territory (such as notified by the registry manager to the scheduler, in response to its entering into the territory registry). This allows consolidating the representations of the corresponding (new/refurbished) buildings into an updated reference image.

Once the scheduler commands a refresh of the reference image, or if no reference image has previously been collected, the collector can command a camera to acquire and return a new version of the reference image. The collector can then save the new version of the reference image into the corresponding file (which may be by replacing its previous version). At block 409, the partitioner characterizes the reference image according to the characteristics of interest of the partitioning rules of all the control policies (retrieved from the corresponding file). For example, in the case of the above-mentioned control policies for detecting unauthorized buildings and for detecting risky buildings, the characteristics of interest are water bodies and impervious mountains, so that the partitioner identifies their representations in the reference image (for example, by applying k-cluster and edge-detection algorithms).

After 409, a loop is entered for determining the partitions of the reference image corresponding to the different control policies. The loop begins at block 412, wherein the partitioner retrieves the partitioning rule of a (current) control policy from the corresponding file. Where more than one control policy exists, the method can begin with a first policy in any arbitrary order or in some embodiments an order may be specified. The partitioner at block 415 determines the relevant portion and/or the non-relevant portion of the reference image as defined in the partitioning rule. For example, in the case of the control policy for detecting unauthorized buildings, the partitioner determines the non-relevant portion corresponding to the water bodies or the impervious mountains, whereas in the case of the control policy for detecting the risky buildings the partitioner determines the relevant portion being around the water bodies within the maximum distance therefrom. The partitioner at block 418 determines a new version of the corresponding partitioning mask (according to the relevant portion and/or the non-relevant portion determined at block 415) and it saves the new version of the partition mask into the corresponding file (which can be by replacing its previous version in some embodiments). At decision block 421, the partitioner checks whether the last control policy has been processed. If not, the flow of activity returns to block 412 to repeat operations 412 through 418 for the partitioning rule of a next control policy. Conversely once all the control policies have been processed, the loop is exited, and the method can go back to block 403 waiting for a next refresh of the reference image.

Separately, and once at least one reference image has been obtained, method 400 can proceed to block 424 upon the scheduler commanding a control of the territory according to the control frequency of any control policy (as indicated in the corresponding file). This can occur whenever the scheduler so commands and may begin the second portion of method 400, depicted in blocks 424 through 487. At block 427, the collector commands the camera to acquire and return a current image (or where a current image has previously been obtained, a new version of the current image). The collector at block 430 normalizes the current image to make it comparable with the reference image. For example, the collector equalizes the current image with the reference image (by sub-sampling or interpolating the current image when its resolution is higher or lower, respectively, than the resolution of the reference image), aligns the current image with the reference image, smoothes the current image, and so on. The collector then saves the (normalized) current image into the corresponding file (which can be by replacing its previous version). The comparator at block 433 retrieves the reference image from the corresponding file, which can be the most recently refreshed reference image from block 406 above. The comparator at block 436 retrieves the (current) control policy that has triggered the control of the territory (from the corresponding file). The comparator at block 439 retrieves the partitioning mask corresponding to the control policy (from the corresponding file). At block 442, the comparator filters the current image and the reference image according to the partitioning mask (for removing their non-relevant portions). For example, the comparator can create a filtered current image and a filtered reference image from the current image and the reference image, respectively, by resetting to a null value the pixel values of the cells thereof having the flags of the corresponding cells in the partitioning mask that are deasserted (whereas the other pixel values remain unchanged).

With reference now to block 445, the comparator compares the filtered current image with the filtered reference image cell-by-cell. Through this comparison, the comparator creates a new version of the difference mask by deasserting or asserting the flag of each cell thereof when the pixel values of the corresponding cells in the filtered current image and in the filtered reference image are substantially equal or different, respectively. For example, pixel values can be deemed equal when a sum of the differences between the corresponding color components is lower or strictly lower than a threshold value like 1-5% of a possible maximum value. Method 400 branches at block 448 according to a result of this comparison. If the filtered current image is substantially equal to the filtered reference image (for example, when the number of flags that are asserted in the difference mask is lower or strictly lower than a threshold value like 1-5% of their total number), the process directly returns to block 424 waiting for a next control of the territory (without performing any action). This allows skipping the operations required to determine the different/critical regions of the filtered current image when the images are determined not to be different and thus not have different/critical regions.

Conversely, if the filtered current image is substantially different from the filtered reference image, method 400 proceeds to block 451 (this connection is depicted in the figures by connecting the circle enclosing "B" at the bottom of FIG. 4A with the same circle at the top of FIG. 4B). A loop begins at block 451 for processing the filtered current image, wherein the comparator segments the difference mask to split the difference mask into smaller portions. The comparator (starting from a first one in any arbitrary order) takes a difference segment of the difference mask into account among a plurality of difference segments of the same size (such as 4-16). The comparator at block 454 compares a current segment of the filtered current image corresponding to the difference segment with a reference segment of the filtered reference image corresponding to the difference segment cell-by-cell as above. Method 400 branches at block 457 according to a result of this comparison.

If the current segment is substantially different from the reference segment as above, the analyzer at block 460 determines any different regions of the current segment representing an important difference as defined in the criticality rule of the control policy. The difference regions are defined by corresponding groups of adjacent cells of the difference mask having their flags that are asserted. In an example embodiment, the different regions can represent an important difference only when their size (i.e., number of cells) is higher (or strictly higher) than a corresponding minimum size indicated in the criticality rule. This allows discarding negligible differences (for example, caused by the addition, removal or moving of small objects like tables, chairs, bins, vases, etc.).

Method 400 enters an inner loop for processing these different regions. The loop begins at block 463 and the analyzer determines whether any different regions of the current segment are still to be processed. If so, the analyzer at block 466 takes one of these different regions into account. In some embodiments, this may begin with a first one in any arbitrary order, while in other embodiments, the analyzer may follow a rule for determining which region to process. The analyzer at block 469 searches in the filtered current image for the representations of any important objects (as indicated in the criticality rule) that is comprised, at least in part, in the different region (for example, by applying cognitive techniques). Particularly, in the case of the control policy for detecting unauthorized/risky buildings the analyzer searches for the representations of any buildings (which have changed significantly in the filtered current image with respect to the filtered reference image). The analyzer at block 472 verifies the representations of the important objects that have been found, if any, against the criticality conditions (as indicated in the criticality rule). For example, in the case of the control policy for detecting unauthorized buildings the analyzer verifies whether the (changed) buildings are not compliant with the territory registry. The analyzer may determine the location of each changed building, verify whether the changed building is listed in the territory registry (according to its location), determine its characteristics indicated in the territory registry (such as extent, height, color), and then verify whether these characteristics match the ones indicated in the territory registry. In another example, in the case of the control policy for detecting the risky buildings, the analyzer determines the extents of the (changed) buildings and then verifies whether they are bigger (or strictly bigger) than the corresponding minimum size.

Method 400 branches at block 475 according to a result of this verification. If one or more important objects have been found and one or more of them fulfill the criticality conditions (i.e., the changed buildings are not compliant with the territory registry or are bigger than the minimum size in the examples at issue), the analyzer at block 478 identifies their representations as corresponding critical regions and the analyzer accordingly updates the criticality mask (initialized with all its flags that are deasserted). The process then returns to the block 463 from the block 478 or directly from the block 475 when no important object has been found or no important object that has been found fulfills the criticality rules (i.e., no changed building has been found or all the changed buildings are compliant with the territory registry or are smaller than the minimum size in the examples at issue).

With reference again to the block 463, as soon as no different region remains to be processed (always true when the current region does not comprise any different region), the above-described loop is exit by descending into block 481. The same point is also reached directly from the block 457 when the current segment is substantially equal to the reference segment. As above, this allows skipping the operations required to determine the different/critical regions of the current segment when they are useless. At this point, the comparator verifies whether the last different segment of the difference mask has been processed. If not, the flow of activity returns to block 451 to repeat the same operations for the next difference segment. Conversely (once all the difference segments have been processed), the loop is exit by descending into block 484. At block 484, the analyzer determines the control actions (as indicated in the criticality rule) to be performed with respect to the important objects represented in the critical regions, if any, and then the analyzer causes the execution of these control actions. For example, in the case of the control policy for detecting unauthorized buildings the notifier sends a notification comprising an indication of the unauthorized buildings (i.e., changed buildings not compliant with the territory registry) to the corresponding authorities. Such a notification can vary in embodiments and may comprise building locations, building representations, and non-compliant characteristics of buildings. In another example, in the case of the control policy for detecting the risky buildings, the analyzer calculates the risk indexes of the risky buildings (i.e., changed buildings in the risky areas bigger that the corresponding minimum size) and the updater then updates the risk registry accordingly. Descending to block 487, the analyzer updates the control frequency of the control policy according to the critical regions that have been determined. Block 487 may not be used in all embodiments, where a constant control frequency may be used instead. In an example of varying control frequency, when one or more critical regions have been determined, the control frequency can be incremented by a predefined percentage (such as 1-2%) multiplied by the number of critical regions; conversely, when no critical region has been determined the control frequency can be decremented by a predefined percentage (such as 1-2%). In this way, the control frequency self-adapts to the actual situation of the territory, so as to cause its control more or less frequently accordingly. Method 400 can then return to block 424 waiting for a next control of the territory (this connection is depicted in the figures by connecting the circle enclosing "A" at the top of FIG. 4B with the same circle at the bottom of FIG. 4A).

In some embodiments, method 400 includes a third portion found in blocks 490 through 496. Method 400 can pass from block 490 to block 493 every time the notification of a risk event is received (for example, a flood). The risk event may be notified either manually (for example, by an operator) or automatically (for example, from a corresponding service such as a bulletin board). In response thereto, the event manager retrieves any control policy for detecting risky buildings (from the corresponding file) whose control actions indicate the same type of risk event (i.e., flood in the example at issue). Continuing to block 496, the event manager retrieves the information of the risky buildings associated with these control policies from the risk registry, such as updated in block 484 above. The risk manager then commands the notifier to send a notification comprising this information to the corresponding authorities (as indicated in the control policies). In this way, up-to-date information about any possible risky situation can be made available as soon as appropriate or necessary. Therefore, it is possible to intervene promptly (for example, by evacuating the risky buildings or rescuing people within the buildings). The risk indexes of the risky buildings can also allow prioritizing these interventions according to their urgency (for example, starting from the risky buildings that are closer to water bodies that may overflow). The process then returns to the block 490 waiting for a next risk event.

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Additionally, different embodiments of the present disclosure may be practiced without some of the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (including comprising its end points). Moreover, ordinal or other qualifiers are merely used as labels to distinguish elements with the same name but do not by themselves connote any priority, precedence, or order. The terms include, comprise, have, contain, involve, and any forms thereof should be intended with an open, non-exhaustive meaning (i.e., not limited to the recited items). The terms based on, dependent on, according to, function of, and any forms thereof should be intended as a non-exclusive relationship (i.e., with possible further variables involved). The term a/an should be intended as one or more items (unless expressly indicated otherwise). The term means for (or any means-plus-function formulation) should be intended as any structure adapted or configured for carrying out the relevant function.

For example, an embodiment provides a method for controlling a territory. However, the territory may be of any type (for example, a municipality, a region, a state) and it may be controlled for any purpose (for example, for legal, safety, mapping reasons).

In some embodiments, the method comprises providing in a computing system a reference image and a current image. However, the computing system may be of any type (see below); moreover, the reference/current images may be provided in any way (for example, acquired in any way, retrieved from any memory, received from any location, etc.).

In some embodiments, the reference image and the current image represent the territory at different times. However, the reference/current images may be of any type (for example, each comprising any number of frames, down to a single one, each with any size, resolution, colors or gray levels). Moreover, the reference/current images may represent the territory in any way (for example, from the sky, ground) and at any time (for example, by acquiring the reference image at the beginning and the current image repeatedly later on, by acquiring the current image repeatedly and using the previous one as its reference image, by generically acquiring two images at different instants, in any case at the same hour of the day, at hours of the day having the same height of the sun or even without any restrictions).

In some embodiments, the method comprises determining by the computing system a partition of the reference image and the current image into a relevant portion and a non-relevant portion. However, any number of partitions may be determined for any purpose (see above); moreover, the relevant/non-relevant portions may be of any type (for example, each comprising any number of separate regions down to a single one).

In some embodiments, the partition is determined according to a partitioning rule. However, the partitioning rule may be of any type (for example, based on any number and type of characteristics of interest and/or on any number and type of external sources, like a registry of green, public, and/or risky areas).

In some embodiments, the method comprises comparing by the computing system the relevant portion of the current image with the relevant portion of the reference image. However, the images may be compared in any way (for example, cell-by-cell, based on edge detection techniques, with texture measures, in any case with or without performing any normalization of the current image).

In some embodiments, the images are compared for determining one or more different regions of the current image with respect to the reference image in the relevant portion thereof. However, the different regions may be in any number and they may be determined in any way (for example, when they have any number and type of characteristics differing by more than any threshold value, down to zero).

In some embodiments, the method comprises determining by the computing system one or more critical regions of the current image corresponding to the different regions. However, the critical regions may be determined for any purpose (see above); moreover, the critical regions may be in any number and they may correspond to the different regions in any way (for example, with each critical region that comprises the corresponding different region, is equal thereto).

In some embodiments, the critical regions are determined according to a criticality rule. However, the criticality rule may be of any type (for example, indicating any number and type of conditions defining the important differences like minimum size, required shape, any number and type of important objects like buildings, landfills, any number and type of criticality conditions like compliance with the territory registry, minimum size, maximum height, partial, different and additional specifications, either individually or in any combination thereof).

In some embodiments, the method comprises providing by the computing system a notification based on the critical regions. However, the notification may be of any type (for example, an e-mail, an instant-message, a pop-up window, a command) for any number and type of recipients (remote authorities, local operators, software programs, other computing machines); moreover, the notification may be based on the critical regions in any way (for example, comprising any information like locations, representations and/or non-compliant characteristics of unauthorized buildings, and with the notification that may be either individual for each critical region or cumulative for all of them).

In some embodiments, the notification is for use in controlling the territory. However, the notification may be used in any way for controlling the territory (for example, ordering penalties/demolitions, causing inspections in the field, manipulating the current image to zoom the critical regions, acquiring more detailed images of the critical regions).

In some embodiments, the method comprises determining by the computing system the partition according to the partitioning rule applied to the reference image. However, the possibility is not excluded of determining the partition in a different way (for example, in the current image in addition or in alternative).

In some embodiments, the method comprises storing by the computing system the reference image in association with an indication of the partition into a memory. However, the partition may be defined and associated with the reference image in any way (for example, by a separate partitioning mask, listing a definition of the regions of the relevant or non-relevant portion, directly into the reference image by flagging its cells accordingly); moreover, this information may be stored in any memory (for example, locally or remotely).

In some embodiments, said step of providing a reference image and a current image comprises acquiring by the computing system the current image. However, the current image may be acquired in any way (for example, from a satellite, a ground installation either fixed or moving, etc.).

In some embodiments, said step of providing a reference image and a current image comprises retrieving by the computing system the reference image and the indication of the partition from the memory. However, the reference image may be retrieved in any way (for example, by reading, downloading it, etc.).

In some embodiments, the method comprises repeating by the computing system said step of acquiring the current image according to a control frequency. However, the same operation may be performed in any way (for example, periodically, in response to specific events, upon a manual request, etc.).

In some embodiments, the method comprises updating by the computing system the control frequency according to the critical regions. However, the control frequency may be updated in any way (for example, at every determination of the critical regions or only after a similar situation persists for two or more determinations thereof, by increasing/decreasing it in percentage or by fixed amounts); in any case, the possibility is not excluded of having a control frequency that is fixed or set manually.

In some embodiments, the method comprises filtering by the computing system the reference image and the current image according to the partition. However, the images may be filtered in any way (for example, by resetting their cells to any value). In any case, the possibility is not excluded of filtering only the reference image or the current image, or of using the partition to limit the search of the different regions even without actually filtering the images.

In some embodiments, the method comprises comparing by the computing system the current image being filtered with the reference image being filtered for determining the different regions. However, the comparison may be performed on whole filtered images (when their non-relevant portions have been reset in the same way) or on their relevant portions only.

In some embodiments, the method comprises determining by the computing system the partition by determining the non-relevant portion according to the partitioning rule comprising a representation of one or more characteristics of interest of the territory making the territory unsuitable for construction. However, the characteristics of interest (making the territory unsuitable for construction) may be in any number and of any type (for example, water bodies, impervious mountains, airports, railway yards, either individually or in any combination thereof).

In some embodiments, the method comprises determining by the computing system the partition by determining the non-relevant portion according to the partitioning rule comprising the representation of water and/or mountain. However, the water may be of any type (for example, the above-mentioned water bodies, partial, different or additional ones, either individually or in any combination thereof) and it may be defined in any way (for example, according to size, pixel values, spectral distribution, statistical pattern or any combination thereof); moreover, the mountain may be of any type (for example, the above-mentioned impervious mountains, partial, different or additional ones, either individually or in any combination thereof) and it may be defined in any way (for example, according to size, slope, elevation, continuity or any combination thereof).

In some embodiments, the method comprises determining by the computing system the critical regions corresponding to the different regions being not compliant with a territory registry storing an indication of one or more authorized improvements to real property on the territory. However, the territory registry may be formed by any number and type of components (for example, building planning, urban planning, either local or regional/national); moreover, the territory registry may indicate any number and type of authorized improvements to real property (for example, exiting buildings, new buildings, refurbishments, extensions, demolitions or any combination thereof).

In some embodiments, the method comprises identifying by the computing system one or more representations of buildings comprised at least in part in the different regions. However, the building may be of any type (for example, houses, factories, complexes) and they may be determined in any way (for example, with cognitive techniques, neural networks, color invariance and canny edge detection algorithms, etc.).

In some embodiments, the method comprises determining by the computing system the critical regions among the representations of the buildings being not compliant with the territory registry. However, the buildings that are not compliant with the territory registry may be determined in any way (for example, when they are not listed therein, when they do not match any number and type of authorized characteristics such as size, color, material or any combination thereof).

In some embodiments, the method comprises estimating by the computing system a size of the buildings according to the representations thereof. However, the size may be defined in any way (for example, area, height, and/or depth) and it may be determined in any way (for example, according to the number of cells for the area, to shades or oblique representations of the territory for the height/depth).

In some embodiments, the method comprises determining by the computing system the critical regions among the representations of the buildings having the size being not compliant with the territory registry. However, the size of the buildings may be deemed not compliant with the territory registry in any way (for example, only when it differs by more than a threshold value).

In some embodiments, the method comprises acquiring by the computing system a new version of the reference image in response to a completion of each of the authorized interventions. However, the reference image may be acquired in any way (either the same or different with respect to the current image); moreover, the reference image may be acquired in response to any number and type of refresh events (for example, periodically, in response to the completion of any authorized intervention, after completing any new infrastructure, upon a manual request or any combination thereof).

In some embodiments, the method comprises determining by the computing system the partition by determining the relevant portion according to the partitioning rule comprising a definition of one or more risky areas of the territory. However, the risky areas may be defined in any way (for example, within any maximum distance from any number and type of risk elements such as (specific) water bodies, woods, on instable grounds such as loam, under places subject to rock falls or any combination thereof).

In some embodiments, the method comprises storing by the computing system an indication of the critical regions into a further memory. However, this information may be of any type (for example, location, with or without any risk index calculated in any way) and it may be stored in any further memory (together with the reference image and its partition(s) or separately therefrom, in the same or different location).

In some embodiments, the method comprises retrieving by the computing system the indication of the critical regions from the further memory in response to a risk event. However, the indication of the critical regions may be retrieved in any way (for example, by reading, downloading it); moreover, this may be triggered by any type of risk events (for example, flood, fire, earthquake, etc.) that have been signaled in any way (for example, notified automatically in push or pull mode, entered manually, etc.).

In some embodiments, the method comprises notifying by the computing system the indication of the critical regions retrieved from the further memory. However, the notification of the critical regions may be of any way (either the same or different with respect to above).

In some embodiments, the notification is for use in controlling the territory. However, the notification may be used in any way for controlling the territory (for example, scheduling/prioritizing evacuations, rescues, addressing alerts, etc.).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

In some embodiments, a computer program is configured for causing a computing system to perform the above-mentioned method when the computer program is executed on the computing system. In some embodiments, a computer program product comprises a computer readable storage medium having program instructions embodied therewith, the program instructions readable by a computing system to cause the computing system to perform the same method. Additionally, the software program may be implemented as a stand-alone module, as a plug-in for a pre-existing software program (for example, the registry manager), or even directly in the latter. Alternatively, it is possible to deploy the same solution as a service that is accessed through a network (such as in the Internet). Moreover, the software program may be executed on any computing system (see below).

In some embodiments, a system comprises means that are configured for performing the steps of the above-mentioned method. In some embodiments, a system comprises a circuit (i.e., any hardware suitably configured, for example, by software) for performing each of the steps of the same method. The system may be of any type (either programmable or not); for example, it is possible to use any computing (or data-processing, executing instructions) system that is stand-alone or with a distributed architecture comprising any number and type of computing machines communicating among them via any local, wide area, global, cellular or satellite network and exploiting any type of wired and/or wireless connections. In any case, the computing system may be implemented by one or more physical machines, virtual machines or a static or dynamic combination thereof (for example, in a cloud computing environment).

Generally, similar considerations apply if the system has a different structure or comprises equivalent components (for example, of different materials) or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enforcing land use controls, wherein the method comprises:
    providing in a computing system a reference image and a current image representing a territory at different times;
    determining, by the computing system, a partition of the reference image into a first relevant portion and a first non-relevant portion and of the current image into a second relevant portion and a second non-relevant portion according to a partitioning rule, wherein the partitioning rule indicates both a minimum region size and a region characteristic value for identifying the first and second non-relevant portions;
    comparing, by the computing system, the second relevant portion of the current image with the first relevant portion of the reference image for determining one or more different regions of the current image with respect to the reference image;
    determining, by the computing system, one or more critical regions of the current image corresponding to the one or more different regions according to a criticality rule, wherein the criticality rule indicates both a minimum difference size and at least one criticality condition for identifying the one or more critical regions; and
    providing, by the computing system, a notification based on the one or more critical regions for use in enforcing land use controls.

2. The method according to claim 1, wherein the method further comprises:
    determining, by the computing system, the partition according to the partitioning rule applied to the reference image; and
    storing, by the computing system, the reference image in association with an indication of the partition into a memory.

3. The method according to claim 2, wherein said providing a reference image and a current image further comprises:
    acquiring, by the computing system, the current image; and
    retrieving, by the computing system, the reference image and the indication of the partition from the memory.

4. The method according to claim 3, wherein the method further comprises:
    repeating, by the computing system, said acquiring the current image according to a control frequency; and
    updating, by the computing system, the control frequency according to the critical regions.

5. The method according to claim 1, wherein the method further comprises:
    filtering, by the computing system, the reference image and the current image according to the partition; and
    comparing, by the computing system, the current image being filtered with the reference image being filtered for determining the different regions.

6. The method according to claim 1, wherein the method further comprises:
    determining, by the computing system, the partition by determining the first non-relevant portion and second non-relevant portion according to the partitioning rule, which comprises a representation of one or more characteristics of interest of the territory making the territory unsuitable for construction.

7. The method according to claim 6, wherein the method further comprises:
    determining, by the computing system, the partition by determining the first non-relevant portion and second non-relevant portion according to the partitioning rule, which comprises the representation of water and/or mountain.

8. The method according to claim 1, wherein the method further comprises:
    determining, by the computing system, the critical regions corresponding to the different regions being not compliant with a territory registry storing an indication of one or more authorized improvements to real property on the territory.

9. The method according to claim 8, wherein the method further comprises:
    identifying, by the computing system, one or more representations of buildings comprised at least in part in the different regions; and
    determining, by the computing system, the critical regions among the representations of the buildings being not compliant with the territory registry.

10. The method according to claim 9, wherein the method further comprises:

estimating, by the computing system, a size of the buildings according to the representations thereof; and determining, by the computing system, the critical regions among the representations of the buildings having the size being not compliant with the territory registry.

11. The method according to claim 8, wherein the method further comprises:

acquiring, by the computing system, a new version of the reference image in response to a completion of each of the authorized improvements to real property.

12. The method according to claim 1, wherein the method further comprises:

determining, by the computing system, the partition by determining the first relevant portion and second relevant portion according to the partitioning rule, which comprises a definition of one or more risky areas of the territory;

storing, by the computing system, an indication of the critical regions into a further memory;

retrieving, by the computing system, the indication of the critical regions from the further memory in response to a risk event; and notifying, by the computing system, the indication of the critical regions retrieved from the further memory for use in enforcing land use controls.

13. A computer program product for enforcing land use controls, the computer program product comprising a computer readable storage medium having program instructions embodied therewith, wherein the computer readable storage medium is not a transitory signal per se, the program instructions executable by a computer to perform a method comprising:

providing in a computing system a reference image and a current image representing a territory at different times;

determining, by the computing system, a partition of the reference image into a first relevant portion and a first non-relevant portion and of the current image into a second relevant portion and a second non-relevant portion according to a partitioning rule, wherein the partitioning rule indicates both a minimum region size and a region characteristic value for identifying the first and second non-relevant portions;

comparing, by the computing system, the second relevant portion of the current image with the first relevant portion of the reference image for determining one or more different regions of the current image with respect to the reference image;

determining, by the computing system, one or more critical regions of the current image corresponding to the one or more different regions according to a criticality rule, wherein the criticality rule indicates both a minimum difference size and at least one criticality condition for identifying the one or more critical regions; and providing, by the computing system, a notification based on the one or more critical regions for use in enforcing land use controls.

14. The computer program product according to claim 13, wherein the method further comprises:

determining, by the computing system, the partition by determining the first non-relevant portion and second non-relevant portion according to the partitioning rule, which comprises a representation of one or more characteristics of interest of the territory making the territory unsuitable for construction.

15. The computer program product according to claim 13, wherein the method further comprises:

determining, by the computing system, the critical regions corresponding to the different regions being not compliant with a territory registry storing an indication of one or more authorized improvements to real property on the territory.

16. The computer program product according to claim 13, wherein the method further comprises:

determining, by the computing system, the partition by determining the first relevant portion and second relevant portion according to the partitioning rule, which comprises a definition of one or more risky areas of the territory;

storing, by the computing system, an indication of the critical regions into a further memory;

retrieving, by the computing system, the indication of the critical regions from the further memory in response to a risk event; and notifying, by the computing system, the indication of the critical regions retrieved from the further memory for use in enforcing land use controls.

17. A system for enforcing land use controls, the system comprising:

one or more processors; and a memory communicatively coupled to the one or more processors, wherein the memory comprises instructions which, when executed by the one or more processors, cause the one or more processors to perform a method comprising:

providing in a computing system a reference image and a current image representing a territory at different times;

determining, by the computing system, a partition of the reference image into a first relevant portion and a first non-relevant portion and of the current image into a second relevant portion and a second non-relevant portion according to a partitioning rule, wherein the partitioning rule indicates both a minimum region size and a region characteristic value for identifying the first and second non-relevant portions;

comparing, by the computing system, the second relevant portion of the current image with the first relevant portion of the reference image for determining one or more different regions of the current image with respect to the reference image;

determining, by the computing system, one or more critical regions of the current image corresponding to the one or more different regions according to a criticality rule, wherein the criticality rule indicates both a minimum difference size and at least one criticality condition for identifying the one or more critical regions; and providing, by the computing system, a notification based on the one or more critical regions for use in enforcing land use controls.

18. The system according to claim 17, wherein the method further comprises:

determining, by the computing system, the partition by determining the first non-relevant portion and second non-relevant portion according to the partitioning rule, which comprises a representation of one or more characteristics of interest of the territory making the territory unsuitable for construction.

19. The system according to claim 17, wherein the method further comprises:

determining, by the computing system, the critical regions corresponding to the different regions being not compliant with a territory registry storing an indication of one or more authorized improvements to real property on the territory.

20. The system according to claim 17, wherein the method further comprises:
    determining, by the computing system, the partition by determining the first relevant portion and second relevant portion according to the partitioning rule, which comprises a definition of one or more risky areas of the territory;
    storing, by the computing system, an indication of the critical regions into a further memory;
    retrieving, by the computing system, the indication of the critical regions from the further memory in response to a risk event; and
    notifying, by the computing system, the indication of the critical regions retrieved from the further memory for use in enforcing land use controls.

* * * * *